United States Patent [19]

Born et al.

[11] 4,407,452
[45] Oct. 4, 1983

[54] APPARATUS FOR MIXING GASES IN MOLECULAR LASERS

[75] Inventors: Gunthard Born; Konrad Altmann, both of Munich, Fed. Rep. of Germany

[73] Assignee: Messerschmitt Boelkow Blohm Gesellschaft mit Beschraenkter Haftung, Munich, Fed. Rep. of Germany

[21] Appl. No.: 234,260

[22] Filed: Feb. 13, 1981

[30] Foreign Application Priority Data

Mar. 5, 1980 [DE] Fed. Rep. of Germany ....... 3008425

[51] Int. Cl.³ .................. B05B 15/00; B05B 17/00
[52] U.S. Cl. .................................................. 239/132.5
[58] Field of Search .................. 239/132.5, 127.3, 403, 239/406, 433, 425.5, 421, 422, 424.5, 424, 291, 428, 407

[56] References Cited

U.S. PATENT DOCUMENTS 2,612,746 10/1952 Goddard ........................... 239/132.5
3,467,312 9/1969 Mehr ................................ 239/132.5

Primary Examiner—James B. Marbert
Attorney, Agent, or Firm—W. G. Fasse; D. H. Kane, Jr.

[57] ABSTRACT

In a molecular laser a cold gas flow is mixed with the hot gas flow by introducing the cold gas flow through slots (13) arranged upstream of the neck (11) of the Laval nozzle (10) through which the hot gas stream flows. In this way a rapid mixing is accomplished for generating non-balanced conditions in a laser gas. Preferably the mixing takes place substantially in the nozzle neck.

9 Claims, 1 Drawing Figure

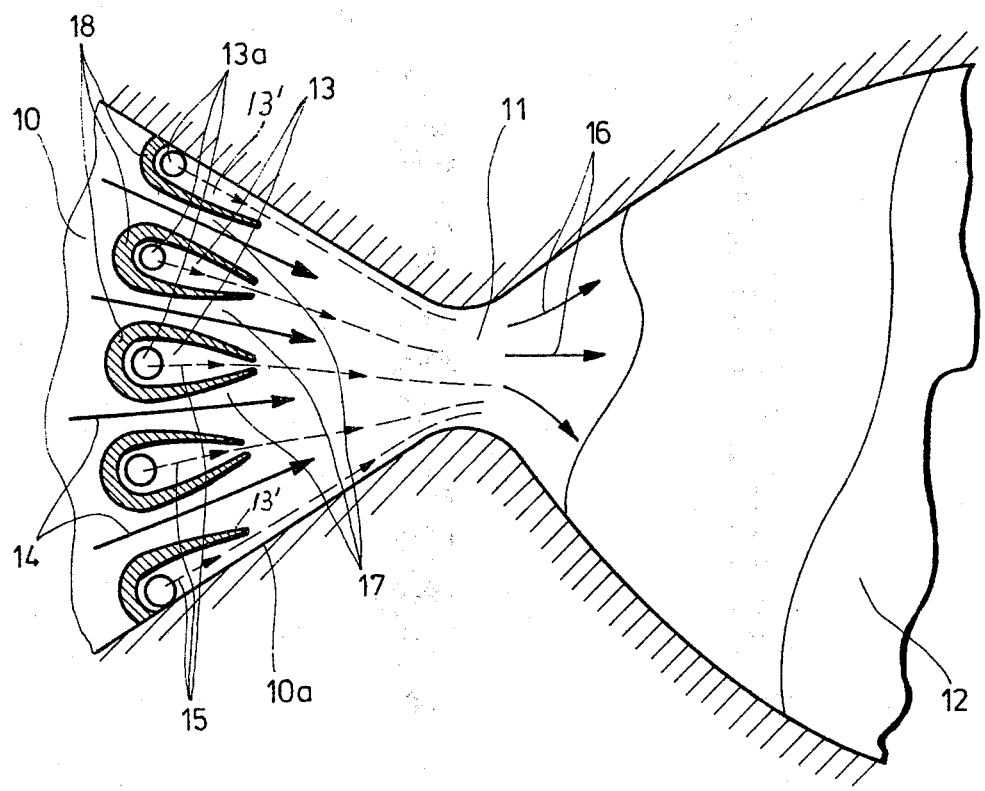

APPARATUS FOR MIXING GASES IN MOLECULAR LASERS

CROSS-REFERENCE TO RELATED APPLICATION

The present application relates to German Patent Application No. P 30 08 425.4-33; filed in the Federal Republic of Germany on Mar. 5, 1980. The priority of said German filing date is hereby claimed.

BACKGROUND OF THE INVENTION

The present invention relates to an apparatus for mixing gases in a molecular laser, preferably in $CO_2$ lasers.

It is known in the art to mix gases in a laser of the mentioned type in which the admixing of hot nitrogen $N_2$ and $CO_2$ takes place in the expanding portion of the nozzle. This type of mixing requires a substantial structural effort for the gas heating on the one hand and for the cooling of the apparatus on the other hand. Besides, the mixing itself takes place at a relatively slow pace.

OBJECTS OF THE INVENTION

In view of the above, it is the aim of the invention to achieve the following objects singly or in combination:
- to provide a gas-mixing device particularly for molecular lasers which permits a very rapid mixing of hot and cold gases for producing of imbalance conditions in a lasing gas;
- to avoid a turbulent mixing to assure a mixing directly in the nozzle neck zones; and
- to utilize the gas to be admixed into the hot lasing gas to simultaneously cool the nozzle wall to thereby protect the nozzle and its components against thermal overloading.

SUMMARY OF THE INVENTION

According to the invention, there is provided an apparatus for mixing gases in a molecular laser in which slots for the introduction of the cold gas are positioned in the nozzle upstream of the nozzle neck so that the cold and hot gases flow toward the nozzle neck in a layered or laminar fashion prior to their actual mixing in the nozzle neck proper.

The desired laminar flow may be controlled by adapting the pressure and the flow speed of the cold gases to the pressure and flow speed of the hot gases.

BRIEF FIGURE DESCRIPTION

In order that the invention may be clearly understood, it will now be described, by way of example, with reference to the single FIGURE in which a partial section through the nozzle portion of a molecular laser is shown with all parts omitted which are not necessary for the illustration of the invention.

DETAILED DESCRIPTION OF PREFERRED EXAMPLE EMBODIMENTS AND OF THE BEST MODE OF THE INVENTION

The laser nozzle may, for example, be a Laval nozzle of which particularly the zone or volume 10 upstream of the neck 11 and the zone or volume 12 downstream of the neck 11 are shown. The flow direction is from left to right. According to the invention, so-called slot chambers 13 are arranged upstream of the nozzle neck 11. The gas is supplied into the slot chambers 13 through openings 13a through which the cold gas represented by the arrows 15 enters.

The slot chambers 13 are formed by aerodynamically shaped walls 18. These walls 18 form so-called flow guide channels 17 between adjacent slot chambers 13. The hot lasing gas represented by the arrows 14 flows through these guide channels 17. The cold gas 15 flows through the slots formed by the chambers 13 into the hot gas flow 14 upstream of the nozzle neck 11 whereby the pressure and speed values of the cold gas are adapted in such a manner to the respective pressure and speed values of the hot gas flow 14 that, upstream of the neck 11, a laminar, layer type flow is produced of the two gases.

Thus, a turbulence or rather a turbulent mixing of the hot and cold gases upstream of the nozzle neck 11 is prevented and the hot and cold gases enter the nozzle neck 11 in the mentioned laminar flow so that the mixing takes place directly in the nozzle neck zone due to the different acceleration of the hot and cold gases through the nozzle.

As shown in the left-hand portion of the figure adjacent to the inner surface of the nozzle inlet portion, the slot chambers 13' are formed together with the inwardly facing surface 10a of the nozzle which has the advantage that the nozzle wall is protected against thermal loads that might otherwise be caused by the hot gas flow 14. The walls 18 forming the slot chambers 13' and 13 are formed as flow guide baffles with a flow dynamic shape, as mentioned above, which enhances the above-described formation of the laminar flow.

Preferably, the injection of the cold gases 15 takes place typically in a zone which is spaced upstream of the nozzle neck 11 by a distance corresponding at least to ten times the width or diameter of the nozzle neck 11. Such nozzle width or diameter of the nozzle neck 11 would preferably be within the range of 0.1 to 1.0 mm. Hence, the spacing between the nozzle neck and the slot chambers 13 would be approximately between 1.0 to 10 mm.

The slot width as measured at the exit of the slot chambers 13 for the cold gas 15 will generally be of a size corresponding substantially to the above mentioned width or diameter of the nozzle neck 11. However, under certain circumstances it may be advantageous when the slot width of the chambers 13 are smaller than the nozzle width or diameter. The number of slot chambers will normally or typically be between 1 and 10. The just mentioned dimensions of the slot chambers are easy to realize, according to the invention, particularly since the slot chambers 13 are spaced from the nozzle neck 11 at a relatively large spacing. Thus, a characteristic mixing zone is obtained which permits a rapid and complete mixing of the gases in the nozzle neck zone to thereby cause the generation of an imbalance or rather an inversion in the nozzle neck zone.

Gases suitable for the suggested mixing could be selected from the group including $CO_2$ or lasing gas mixtures such as $CO_2$, $N_2$, $H_2O$ and HE. The hot gas temperature will typically exceed 2000° K. and the cold gas temperature will typically be approximately 300° K. The mass ratio of cold gas to hot gas will also normally be in the range of 1:10 or 10:1.

The suggested embodiment is also suitable for CO lasers, chemical lasers such as of the DF, HF, HCl, etc. types. In all instances a successful use is possible with the above enumerated advantages.

Although the invention has been described with reference to specific example embodiments, it will be appreciated, that it is intended to cover all modifications and equivalents within the scope of the appended claims.

What is claimed is:

1. An apparatus for mixing gases in a molecular laser, comprising nozzle means having a nozzle neck (11) through which a hot laser gas may flow, said nozzle means further comprising a first volume (10) upstream of said nozzle neck (11) and a second volume (12) downstream of said nozzle neck (11), and slot means (13) positioned in said first volume (10) of said nozzle means upstream of said nozzle neck (11) for introducing a cold gas through said slot means (13) into said hot laser gas, and wherein said slot means (13) are sufficiently spaced upstream of said nozzle neck (11), so that mixing of the cold gas with the hot gas takes place substantially in said nozzle neck (11).

2. The apparatus of claim 1, wherein said slot means are so arranged that the pressure and flow speed of the cold gas are adapted to the pressure and flow speed of the hot gas for providing a laminar, layered type gas flow just downstream of said slot means and upstream of said nozzle neck.

3. The apparatus of claim 1, wherein said slot means (13) comprise gas injectors (18) having an aerodynamic shape in said first volume (10) upstream of said nozzle neck (11).

4. The apparatus of claim 1, wherein said nozzle neck has a flow passage clearance of given size and wherein said slot means are located upstream of said nozzle neck at a spacing corresponding to at least about ten times said given size of said clearance.

5. The apparatus of claim 1, wherein said slot means comprise a number of gas injectors, said number being within the range of one to ten.

6. The apparatus of claim 1, wherein said nozzle neck has a flow passage diameter within the range of 0.1 to 1.0 mm.

7. The apparatus of claim 6, wherein said slot means have a slot width corresponding substantially to said flow passage diameter.

8. The apparatus of claim 6, wherein said slot means have a slot width which is smaller than the respective flow passage diameter.

9. The apparatus of claim 1, wherein said slot means comprise a radially outer slot wall which forms a slot with the wall of the nozzle means for cooling the wall of the nozzle means.

* * * * *